(12) United States Patent
Rutten

(10) Patent No.: US 8,767,219 B2
(45) Date of Patent: Jul. 1, 2014

(54) WIDEBAND OPTICAL POSITION SENSOR WITH NORMALIZATION

(76) Inventor: Paul Edmond Rutten, Baarle-Hertog (BE)

( * ) Notice: Subject to any disclaimer, the term of this patent is extended or adjusted under 35 U.S.C. 154(b) by 254 days.

(21) Appl. No.: 13/261,267

(22) PCT Filed: Dec. 8, 2009

(86) PCT No.: PCT/NL2009/050744
§ 371 (c)(1),
(2), (4) Date: Apr. 18, 2012

(87) PCT Pub. No.: WO2011/071366
PCT Pub. Date: Jun. 16, 2011

(65) Prior Publication Data
US 2012/0206735 A1 Aug. 16, 2012

(51) Int. Cl.
*G01B 11/14* (2006.01)
(52) U.S. Cl.
USPC .......................... 356/622; 356/614; 356/615
(58) Field of Classification Search
CPC ......... G01J 1/04; G01J 1/0414; G01J 1/0477; G01J 1/4228; G01J 1/4257; G01J 1/44
USPC ..................... 356/237.1–241.6, 242.1–243.8, 356/426–431, 600–640
See application file for complete search history.

(56) References Cited

U.S. PATENT DOCUMENTS

| 3,723,013 | A | * | 3/1973 | Stirland et al. ............. 356/152.1 |
| 3,894,230 | A | * | 7/1975 | Rorden et al. ................ 356/622 |
| 4,772,095 | A | * | 9/1988 | Spencer ........................ 359/629 |
| 5,446,274 | A | * | 8/1995 | Luce et al. ................. 250/206.2 |
| 5,923,418 | A | * | 7/1999 | Clark et al. ..................... 356/153 |
| 7,409,312 | B2 | * | 8/2008 | Conner et al. ................ 702/159 |
| 2006/0158666 | A1 | * | 7/2006 | Schelinski et al. ............ 356/614 |

* cited by examiner

*Primary Examiner* — Gregory J Toatley
*Assistant Examiner* — Jarreas C Underwood

(57) ABSTRACT

A novel electro-optical sensor for the wideband and normalized translation of the two-dimensional position of a light beam transverse to its traveling direction into electrical position signals. Incident on the sensor is the light beam 122 which is divided with a beamsplitter 121 into a transmitted beam 123 and a reflected beam 124 which both have similar transverse motion behavior as the incident beam. From each of these divided beams the position is determined one-dimensionally with an one-dimensional optical position sensor, 125, 126. The one-dimensional position determination is done by dissecting each divided beam into two beams using a partitioning element. The outputted dissected beams have a power distribution that depends on the position of the divided beam relative to the partitioning element. Each beam is optically coupled to a photo detector which translates its power into an electric current. In each circuit 127, 128, the two photo detectors are reverse biased and electrically connected in series. The node connecting them is a current type position output. The sum current through the two photo detectors is determined using two current mirrors. The first mirrors the current through one photo detector, the second mirrors the output current of the first current mirror plus the current through the second photo detector and outputs a current type sum signal. Each position signal is normalized with respect to its sum signal using an analog-to-digital converter, 129, 130, with the sum signal coupled to the reference input and the position signal coupled to the regular signal input.

18 Claims, 7 Drawing Sheets

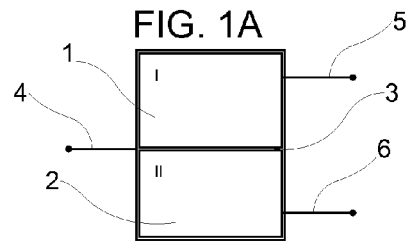
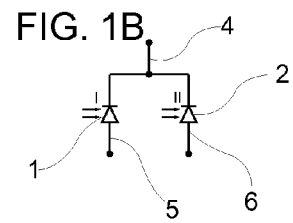
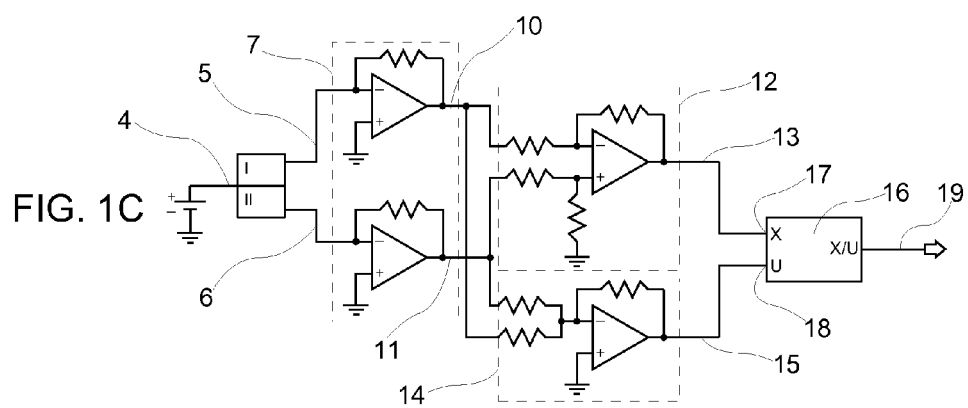
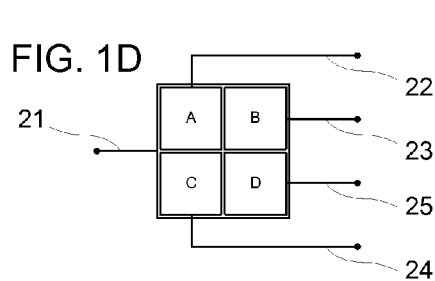
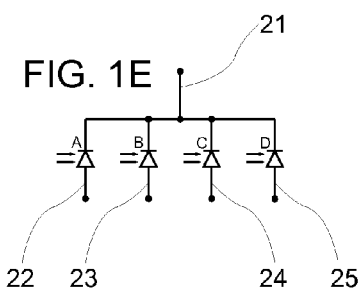
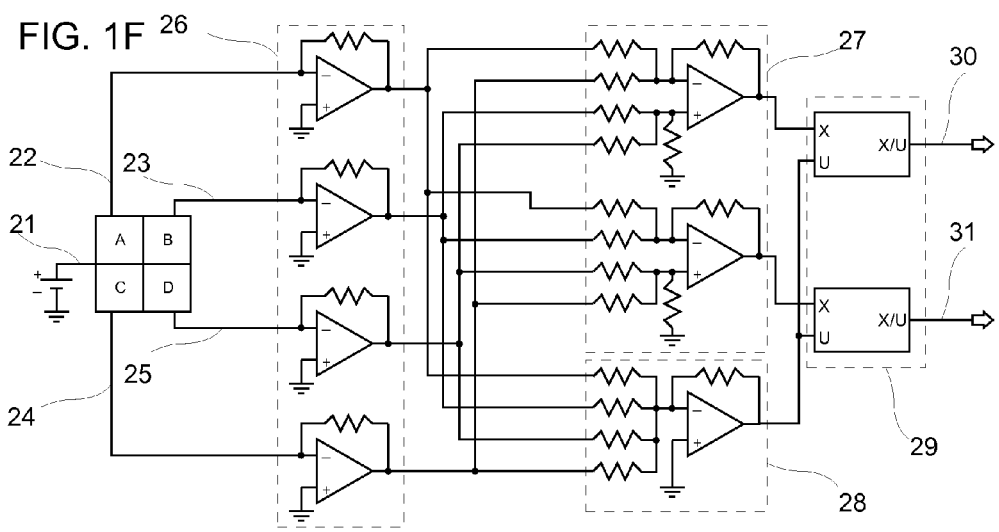

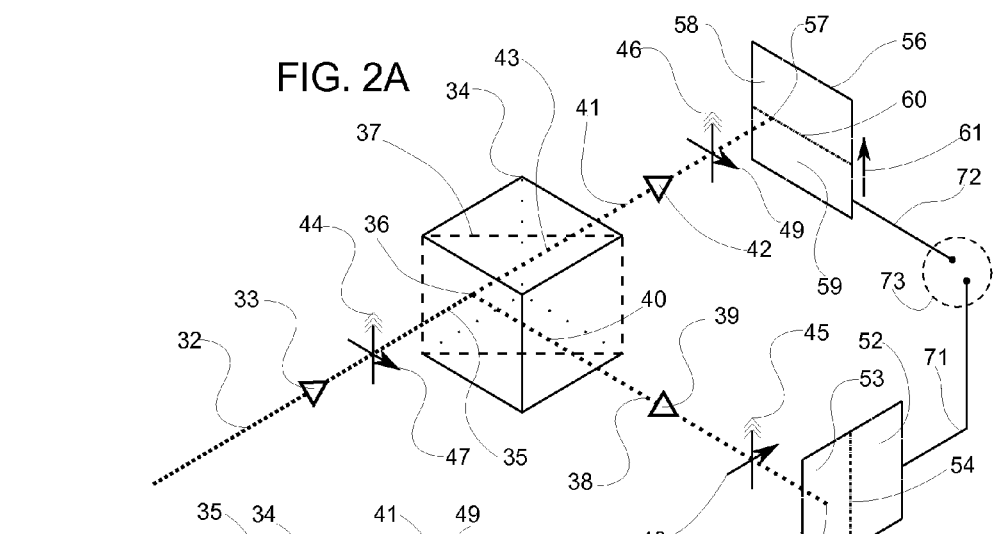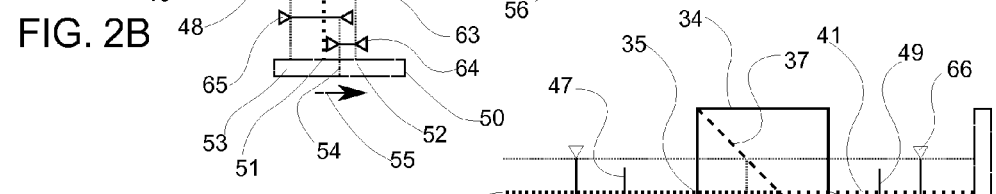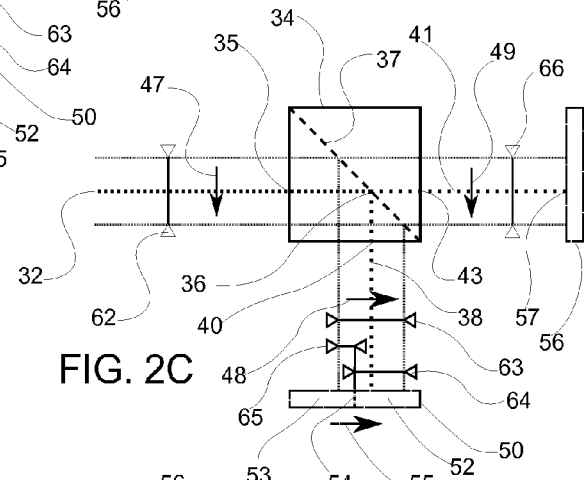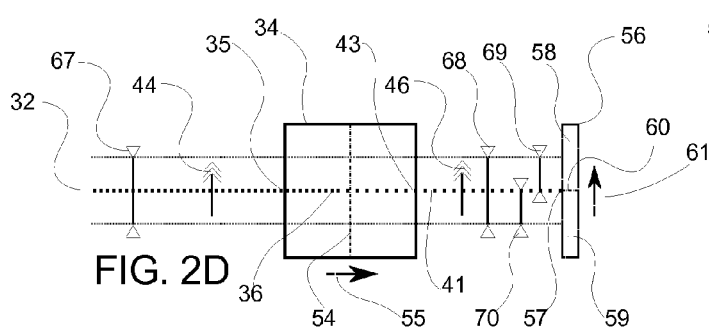

WIDEBAND OPTICAL POSITION SENSOR WITH NORMALIZATION

FIELD OF INVENTION

This invention relates to an electro-optic optical position sensor. More particularly, the invention relates to a method and system for receiving and converting optical signals to a position and a sum signal with high bandwidth and high signal to noise ratio, and a method for the high bandwidth normalization of one such signal with respect to another such signal.

BACKGROUND OF THE INVENTION

Optical position sensors are used to monitor the location of an optical spot that is incident upon the active area surface of a device. They are commercially available in a one-dimensional and a two-dimensional version, which are also commonly called a Position Sensitive Detector (PSD) or a Position Sensitive Photo Detector (PSPD).

Two types of monolithic position sensitive photo detectors are widely available for measurements in one dimension. The lateral effect detector incorporates an electric resistive layer over the active surface area of a single photo diode, with electrical contacts at either end of the layer. This type of detector is useful for measuring the centroid of an optical spot that may move across the entire photosensitive area. A second type, called the bi-cell, is sensitive to displacements that are small compared to the size of the optical spot, and commonly is used to monitor perturbations of a probe beam caused by mechanical vibrations or optical misalignment. The bi-cell, as the name already indicates, is composed out of two cells, I, 1 and, II, 2, that are adjacent to each other and have a small gap 3 between them, See FIG. 1A. The surface of each cell represents a photodiode. The photodiodes are fabricated on a monolithic chip and share the cathode 4 and have an individual anode, 5 and 6, see FIG. 1B. In a position detector system, see FIG. 1C, their anodes are typically connected to transimpedance amplifiers 7 or so called I-V converters that convert the current signals from the photodiodes, $I_I$ and $I_{II}$ that run through wire 5 and 6, into inverted voltage signals $-U_I$ and $-U_{II}$ at 10 and 11. A differential/sum amplifier 12 subtracts $-U_I$ from $-U_{II}$ and outputs the result $(U_I-U_{II})$ on 13. A summing amplifier 14 sums $-U_I$ and $-U_{II}$, inverts this, and outputs the result $(U_I+U_{II})$ on 15. The I-V converters, the differential/sum amplifier and the summing amplifier are typically constructed using operational amplifiers (opamps).

The difference signal $(U_I-U_{II})$, 13, is connected to the divider 16 at the signal input 17 pin. The sum signal $(U_I+U_{II})$, 15, is connected to the denominator input, 18, of the divider. The output of the divider, 19, represents the one-dimensional position of the optical spot normalized with respect to the detection range and is mathematically represented by $P_{ID}=(U_I-U_{II})/(U_I+U_{II})$.

Theoretically the difference signal $(U_I-U_{II})$ corresponds with the location of the optical spot on the active areas, and the sum signal $(U_I+U_{II})$ corresponds with the total light intensity on the active areas. In order to get a position value $P_{ID}$ that depends on the light spot size and is independent of the total light intensity the normalization is performed, which is done by dividing the difference signal with the sum signal. This links the output voltage directly to the size of the optical spot making it sensitive to small position perturbations of the beam and reduces noise that is induced by light intensity variations.

The two-dimensional monolithic PSDs are also widely available in two types, which are derived from the one-dimensional version. There is a duo lateral effect detector (L. Lindholm, PCT/SE2001/001235) which is useful for measuring the two-dimensional position of the spot centroid across the entire photosensitive area. And there is a quad-cell, or so called quadrant photodiode or four-segment photodiode that is sensitive to displacements that are small compared to the size of the optical spot and is frequently used in Atomic Force Microscopy (AFM), Friction Force Microscopy (FFM), Scanning Probe Data Storage, optical levers, autocollimators, optical beam profiling, laser beam position sensing, and other alignment applications. Like the name indicates, it is composed out of four active cells, denoted A, B, C, and D, which are ordered in a 2×2 array and are separated by a small gap, see FIG. 1D. Like the bi-cell, each active cell of the quad-cell represents a photodiode which are fabricated together on a monolithic chip and have a shared cathode, 21, and a individual anode, 22, 23, 24, 25, see FIG. 1E. A typical two-dimensional position detector system is constructed using opamps and contains four I-V converters, 26, two sum/difference amplifiers, 27, one summing amplifier, 28, and two dividers, 29, See FIG. 1F. There are two electrical outputs, 30 and 31, one for the normalized vertical position signal, $P_V=(U_A+U_B-(U_C+U_D))/(U_A+U_B+U_C+U_D)$, and one for the normalized horizontal position signal, $P_H=(U_B+U_D-(U_A+U_C))/(U_A+U_B+U_C+U_D)$.

Like with the bi-cell, the normalization is performed by dividing the difference signal with the sum signal in order to get the normalized vertical position value $P_V$ respectively a normalized horizontal position value $P_H$. The two difference signals, $(U_A+U_B)-(U_C+U_D)$ and $(U_B+U_D)-(U_A+U_C)$, are analogs of the relative intensity difference of the light sensed by opposing pairs of the photodiode quadrant elements. The sum signal, $(U_A+U_B+U_C+U_D)$, is the analog of the intensity sensed by all four quadrant elements together.

The conventional bi- or quad-sensors require I-V and sum/subtraction stages in order to retrieve the position signals from the photo sensitive segments. The I-V stage transforms the current coming out of the photo segments into a corresponding voltage which then by means of the sum and difference amplifiers is transformed into a voltage type position signal. This means that the signal traverses two sequential opamp stages before the position signal can be normalized, see FIGS. 1C, and 1F.

The use of opamps has serious downsides. Wideband I-V converters tend to be unstable (pag. 29, Mark Johnson. Photodetection and Measurement, Mc Graw-Hill, ISBN 0-07-140944-0) and add unwanted oscillatory signals to the position signal that decreases the maximum obtainable position resolution. Furthermore, conventional frequency-compensated opamps use an internal RC combination to give a dominant frequency pole at around 20 Hz. Above this frequency the gain drops off at a rate of −20 dB/decade, reaching 0 dB (unity gain) at the frequency corresponding to the Gain Bandwidth Product (GBW). The gain is therefore an approximately inverse function of frequency over the useful frequency range. The gain at any frequency f is approximately GBW/f, and the upper frequency limit or bandwidth of the transimpedance amplifier is: $f_{limit}=(GBW/\{f_{limit}2\pi R_f C_p\})^{1/2}$. This is an approximate expression (pag. 29, Mark Johnson. Photodetection and Measurement, Mc Graw-Hill, ISBN 0-07-140944-0) and should not be relied on for exacting accuracy. Typically the limiting frequency is half the value calculated from this expression. So, due to the use of opamps the bandwidth of the position sensor is severely limited.

For a typical wideband photodiode transimpedance amplifier consisting out of a 12 pF photodiode connected to an OPA657 opamp having a GBW of 1.6 GHz and a 200 kOhm feedback resistor, the bandwidth is 10 MHz (Texas Instruments, OPA 657 Datasheet).

Also, the sum and difference amplifiers have a bandwidth that is limited by the Gain Bandwidth Product (GBP) of the opamps used. (P. Horowitz, The art of electronics, Cambridge University Press). The sum and sum/subtraction stage also contains a feedback resistor, see FIG. 1.F, and when concatenated to the above wideband photodiode transimpedance amplifier would reduce the bandwidth of the sensor system even further, to values below 10 MHz.

The fastest optical position sensor reported is the sensor used by Toshio Ando of Kanazawa University Japan (T. Ando et. al., Eur J Physiol, DOI 10.1007/s00424-007-0406-0, Springer-Verlag, 2007) and is used in an optical beam deflection detector for high speed atomic force microscopy and nano visualization of biomolecular processes. The sensor is based on a four-segmented 3 pF 40 MHz Si Pin photodiode and a custom-made fast amplifier/signal conditioner having a bandwidth of about 20 MHz. Usually in high speed microscopy the position signals are not normalized because analog signal dividers are limited to about 10 MHz (Analog Devices, AD734) and real-time digital division introduces unwanted signal delays.

Furthermore, the feedback resistors of the I-V stage and the sum/subtraction stage are a source of thermal noise known as Johnson noise. It is highly desirable to be able to measure the position of an optical spot with the least electrical noise possible (J. D. Spear, low noise optical position sensor, pat. US005880461A). Spear has invented a separate-bi-cell photodetector that does not require the difference amplifier and therefore reduces the Johnson noise of the system by the elimination of that stage. His design however still requires the use of the bandwidth limiting opamp I-V amplifier or so called current-to-voltage amplifier.

In his design, two separate photo segments are connected in parallel to the I-V converter doubling the capacitance on the input of the I-V converter with respect to that of a single photodiode connected. Because the bandwidth of the sum/difference amplifier is much larger than that of the I-V converter the connection of the second photodiode to the opamp about halves the bandwidth of the position sensor system. Also, because still the opamp I-V converter is used the unwanted oscillatory distortion is still present in the output signal in wideband applications together with the Johnson noise that originates from the feedback resistor.

Furthermore the distortion of the position signal due to light intensity fluctuations cannot be normalized out of this system because the sum signal cannot be distracted from it. Their design demands that the two photodiodes have to be connected in parallel to each other, "with the cathode of the one photodiode connected to the anode of the other photodiode and the anode of the said one photodiode connected to the cathode of the said other photodiode". This parallel connection leaves no connection left for the independent determination of the currents running through each photodiode so that that the sum signal cannot be retrieved. Hence making it impossible for the position signal to be normalized.

So, for wideband high sensitivity position measurements of an optical beam the conventional detector cells having the standard two stage opamp circuitry in combination with an analog signal divider are considered to be the best measuring device available.

In our inventive two-dimensional optical position sensor the decomposition of the two-dimensional input signal into two times a one-dimensional signal is performed optically so that the electrical determination of the position and sum signals can be performed for each dimension independently from the other dimension. This enormously increases bandwidth and signal-to-noise ratio, and decreases cross couplings, noise, and system complexity.

Our inventive light beam position sensor does not require I-V amplifiers nor does it require additional sum and/or sum/subtraction stages for the retrieval of one-dimensional or two-dimensional position signals. Hence it is not limited in bandwidth due to these amplifiers and interconnections, and does it not contain the thermal noise and oscillatory distortions these elements produce.

Also does our inventive sensor permit the retrieval of signals from the photo-segments for the construction of the sum signal. We have also invented a wideband method to perform the summing required without interfering with the position signals. Hence, a wideband means for the sum signal is provided while keeping the position signals wideband also.

Additionally, to solve the normalization problem, we have invented a wideband normalization method capable of normalizing signals up to the conversion rate of the fastest analog-to-digital converters available, which is nowadays about 2 GS/s for a single analog-to-digital converter. Interleaved analog-to-digital converter systems would increase the bandwidth of the normalization method even further. This normalization method does not require any extra components at all when the position signal is to be digitized in the application where it is used in. This would result in an enormous system simplification, cost reduction, and energy saving, as the outputs of conventional position sensors are almost always digitized for recording or processing purposes.

With the conventional sensor there is a separation gap, 3, between the active areas. In cases where a non-homogenous light spot is used errors occur due to this gap. This error becomes larger when smaller photodiode areas are used because the area width to gap width ratio decreases. The gap makes it impossible to use small photodiode areas which are faster in response due to their lower internal capacitance.

In our inventive sensor there is no separation gap necessary between the segments so that any errors that are produced due to this separation gap are not present. This opens the opportunity to focus the optical beam on small photodiode areas without the gap error.

In the prior art sensors back reflection of light in the direction of the incoming beam can result in problematic errors. This can be prevented in our inventive detector. It reduces optical pollution—which is about 40% of the incident light—in the application wherein the sensor is used. In applications where coherent light is used pollution due to interference effects of the incoming bundle with the back scattered bundle are thus removable.

In the alignment of a conventional two-dimensional sensor the sensor needs to be moved as a whole in the plane of the position-detection with the result that by movement of the center position of the first axis there is always some uncontrollable movement of the center position of the second axis. This unwanted dis-alignment of the second axis center then requires supplemental alignment which in turn dis-aligns the first axis center again. So, the alignment of the conventional sensor is an iterative process requiring multiple steps which is time-consuming to do manually and is difficult to make automatic due to the iteration process involved.

Our inventive sensor has an unexpected result. It permits the horizontal and vertical center positions to be adjusted without cross-couplings to each other so that the alignment of the axis can be done in one step which can be quickly performed manually and would be easily to implement automatically.

Thus a need exists for a one-dimensional and two-dimensional optical position sensor which allows high bandwidth without sacrificing signal to noise ratio unnecessary. There is further need for a high speed optical position sensor that also outputs the total intensity (sum) signal at high bandwidth. There is also a need for an optical position sensor which allows electrical design flexibility in its output properties for integration with other electronics. There is also a need for the high and wide bandwidth normalization of a position signal with respect to a sum (total intensity) signal.

Furthermore there is a need for an optical position sensor that; has a low amount of back scattered light, that allows easy and direct alignment without cross coupling among its axis, that has a low temperature drift, and has no dead gap between the photo sensitive segments.

SUMMARY OF THE INVENTION

These needs may be addressed by the present invention which is embodied in a novel two-dimensional optical position sensor for reception of the two-dimensional deflection of an optical beam and conversion of that signal to a two-dimensional electrical wideband normalized position output signal, see FIG. 8.

The sensor has a beam splitter 121 capable of dividing an input beam 122 in two output beams, 123, 124, that have similar deflection behavior as the input beam. For each of these output beams a one-dimensional position component is measured by a wideband one-dimensional optical position detector, 125, 126. The joint output signal of the two one-dimension position sensors is a two-dimensional position signal corresponding to the position of the optical beam incident on the beamsplitter. For one-step alignment each one-dimensional photodetector is mounted on a linear adjustable stage.

In each one-dimensional position detector a partitioning element dissects an input beam in two output beams which each have a beam width that depends on the spatial position of the input beam with respect to the partitioning element. The first partition element output beam is incident on a first optical sensor and has a first output terminal and a second output terminal.

A first photo detector which produces an electrical signal in response to a light input is coupled between the first and second output terminals. The first photo detector is exposed to the first output of the partitioning element. The second partition element output beam is incident on a second optical sensor and has a third output terminal and a forth output terminal. A second photo detector which produces an electrical signal in response to a light input is coupled between the third and forth output terminals.

By tilting the photodetector areas with respect to their input beams a low back reflection coefficient is obtained and responsivity can be increased. By using a symmetrical partitioning element the output has low thermal drift. And by using a sharp partitioning elements no dead gaps exists enabling the focusing of the light beam on small area photodiodes without introducing a gap error.

In the circuits 127, 128, that retrieve the position and sum signals from the one-dimensional optical position sensors, the photodiodes from each detector are connected in series by connecting the anode of one of the photodiodes to the cathode of the other photodiode. The photodiodes are reverse biased by applying a positive bias voltage to the free cathode and a negative bias voltage to the free anode. Due to the series connection the node connecting the photodiodes together provides a current output that corresponds with the beam position relative to the center of the partitioning element. This output current signal can be converted to a voltage signal by means of a load resistor. By varying the load resistor the bandwidth and output signal range of the sensor can be varied. Bandwidths of more than 1 GHz can be obtained without amplification. With amplification higher bandwidths can be obtained, up to 60 GHz at present.

The sum signal is derived using current mirrors. By means of a NPN current mirror connected between the negative bias supply and the anode of the negative reverse biased photodiode the current through this photodiode is mirrored. The output of this NPN current mirror is connected together with the cathode of the positive reverse biased photodiode to the input of a PNP current mirror that is connected between the cathode of the positive reverse biased photodiode and the positive bias voltage. The output of the PNP current mirror presents the sum current, which can also be converted to a voltage signal by means of a load resistor. When, in comparison to the photodetectors, transistors with a relatively low capacitance and differential resistance are used to build the current mirrors, the sum signal output has about the same bandwidth as the position signal output. To obtain larger signal values without the expense of bandwidth, amplifiers can be used to amplify the position and sum signals. Suitable amplifiers up to 60 GHz are available at present. At the expense of bandwidth the output values can be increased by amplifying the photo-currents with a transistor.

To normalize the position signal with respect to the sum signal an analog-to-digital converter with a reference input is used 129, 130. To apply the normalization method, the sum signal is connected to the reference input of the analog-to-digital converter and the position signal is connected to the regular input. The analog-to-digital converter then outputs the normalized position signal digitally. By means of an digital-to-analog converter this signal can be made analog if required. Digital processing techniques can be applied on the digital normalized position signal prior to the digital-to-analog conversion. Bandwidths of 2 GHz can be obtained using high speed flash type analog-to-digital converters available at present. Using interleaved converters this bandwidth can be increased even further.

It is to be understood that both the foregoing general description and the foregoing detailed description are not limiting but are intended to provide further explanation of the invention claimed. The accompanying drawings, which are incorporated in and constitute part of this specification, are included to illustrate and provide a further understanding of the methods and systems of the invention. Together with the description, the drawings serve to explain the principles of the invention.

SUMMARY DESCRIPTION OF THE DRAWINGS

FIG. 1A shows a sketch of the prior art bi-cell photodiode.

FIG. 1B shows the wiring scheme of the prior art bi-cell photodiode.

FIG. 1C shows the typical schematic circuit diagram of the prior art bi-cell photodiode optical position sensor with a normalized output.

FIG. 1D shows a sketch of the prior art quadrant photodiode.

FIG. 1E shows the wiring scheme of the prior art quadrant photodiode.

FIG. 1F shows the typical schematic circuit diagram of the prior art quadrant photodiode optical position sensor with normalized outputs.

FIG. 2A shows a sketch of the perspective view on the inventive two-dimensional optical position sensor comprising a beamsplitter and two one-dimensional optical position sensors.

FIG. 2B shows a sketch of the top view of FIG. 2A prior to a beam deflection on the horizontal axis.

FIG. 2C shows a sketch of the top view of FIG. 2A after a beam deflection on the horizontal axis.

FIG. 2D shows a sketch of the side view of FIG. 2A illustrating how a deflection in the vertical direction is detected.

DESCRIPTION OF THE PREFERRED EMBODIMENT

Figure 3A:
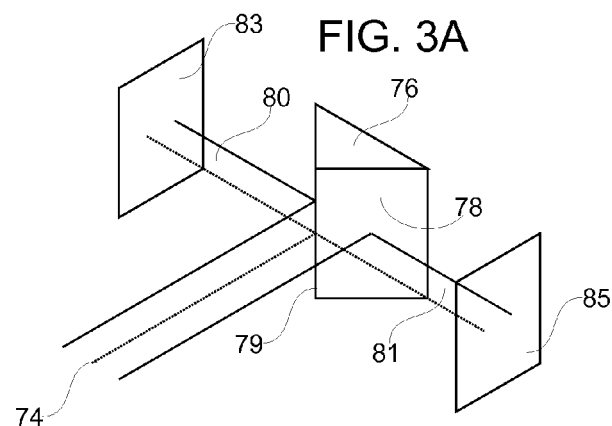
FIG. 3A shows a sketch of the perspective view of the inventive one-dimensional optical position sensor comprising a partitioning element and two photodetectors.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

FIG. 2A shows the perspective view of the inventive electro-optic light beam position sensor that is capable of determining the two-dimensional position transverse to the traveling direction of an incoming light beam with respect to a center position. The position transverse to the traveling direction of a light beam with respect to a center position is also called the deflection of that light beam. It works as follows.

The center of the incoming light beam 32 having a traveling direction as indicated by 33 is incident on beam-splitter 34 at point 35 where at point 36 it hits the beam-splitters partial reflective surface which is enclosed by 37. At the point where the incoming beam hits the beam-splitters partial reflective surface one part of the light of the incident beam is reflected in a direction dependent on the orientation of the partial reflective surface with respect to the incoming beam while the other part of the light of the incoming beam is not affected by the partial reflective surface and is transmitted through the partial reflective surface. Hence incoming beam 32 is split in two beams at point 36; a reflected light beam 38 having a traveling direction indicated by 39 that exits the beam-splitter at point 40, and a transmitted beam 41 having traveling direction 42 exiting the beam-splitter at point 43.

A deflection of the incoming beam 32 in the vertical direction indicated by arrow 44 has as result that point 36 where the incoming beam 32 hits the partial reflective surface 37 is also deflected in the direction as indicated by arrow 44. Due to the deflection of point 36 into direction 44 the reflected beam 38 is deflected in direction 45, and the transmitted beam 41 is deflected in direction 46. Furthermore, a deflection of the incoming beam 32 in the horizontal direction as indicated by arrow 47 has as consequence that point 36 is also deflected, and because point 36 moves over the partial reflective surface enclosed by 37—and the reflective surface has an angle with respect to that deflection direction—the deflection of the reflected beam 38 is in the direction as indicated by arrow 48. The deflection of the transmitted beam 41 as result to a deflection of the incoming beam 32 in the horizontal direction 47 is in the direction of arrow 49. So, the horizontal 48 and vertical 45 deflection of the reflected beam 38 and the horizontal 49 and vertical 46 deflection of the transmitted beam 41 are similar to the horizontal 47 and vertical 44 deflection of the incoming beam 32.

There are now two beams available—the reflected beam 38 and the transmitted beam 41—for the two-dimensional position determination of the incoming beam 32 that both have similar deflection behavior as the incoming beam 32. So, the two-dimensional deflection determination of the incoming beam 32 can be decomposed in two times a one-dimensional deflection detection where a first one-dimensional deflection detection is performed on the reflected beam 38 and a second one-dimensional deflection detection is performed on the transmitted beam 41. Now the combination of one-dimensional measurements on the reflected and transmitted beam is a two-dimensional measurement of the incoming beam, whereby the axis of detection and the center position can be freely chosen by the orientation of the two one-dimensional optical position sensors.

FIG. 2B and FIG. 2C show the electro-optic setup of FIG. 2A as seen from the top and illustrate how a beam deflection in the horizontal direction would be determined by the sensor. In FIG. 2B the incoming beam 32 is about to deflect in direction 47, and FIG. 2C shows the situation after beam 32 has performed the deflection.

In FIG. 2B, the incoming beam 32 has a horizontal width as indicated by 62 and is about to move in the direction indicated by arrow 47. As a result the reflected beam 38 having a horizontal width as indicated by 63 is about to move in the direction of arrow 48 and beam 41 having a width 66 is about to move in direction 49.

Sensor 50 is a one-dimensional deflection sensor containing a positive area 52 and a negative area 53 which are separated by line 54. The reflected beam center 38 hits the deflection sensor 50 at point 51. A measure for the location of point 51 with respect to the separation line 54 of sensor 50 is the horizontal deflection value, H, to be obtained.

In FIG. 2B, the beam center 38 hits deflection sensor 50 at point 51 and is on the negative area 53 of it. In FIG. 2C, the beam center 38 hits sensor 50 at its positive area 52. So, the beam has moved from a negative position value to a positive position value following the figures from FIG. 2B to FIG. 2C.

Sensor 50 transforms the light power incident on its positive area 52 into electric signal $H_+$ and transforms the light power incident on its negative area 53 into electric signal $H_-$. The amount of power incident on the positive area 52 corresponds with the part of the beam that is incident on area 52 and is indicated by 64. The amount of light power incident on the negative area 52 in that respect is indicated by 65.

In FIG. 2B, where beam 38 is about to move into direction 48, the power incident on the positive area 64 is less than the power incident on the negative area 65. So, the beam power imbalance, where the power incident on the positive area 52 is assigned a positive value and the power incident on the negative area 53 is assigned a negative value, is $H_+-H_-$, and has a negative value in FIG. 2B.

After the movement in direction 48, as is shown in FIG. 2C, the beam power 64 incident on the positive area 52 is larger than the beam power 65 incident on the negative area 53. Hence, the beam power imbalance $H_+-H_-$ in FIG. 2C has a positive value. The value $H_+-H_-$ is thus a measure for the horizontal deflection of the reflected beam 38 in the positive—along with arrow 55—and negative—in direction opposing arrow 55—direction. So, when electric signal $H_-$ is subtracted from the electric signal $H_+$, a signal $H=(H_+-H_-)$ is obtained which corresponds to the horizontal deflection of beam 38. When H is positive, it provides a value of how far the center of the beam is away from the separation line 54 into the positive area, and in the case it is negative provides a value of how far the beam center is separated from the separation line 54 into the negative area.

Furthermore signal H corresponds with the horizontal deflection 47 of the incident beam 32 and the horizontal deflection 49 of the transmitted beam 41 and so provides a measure for the horizontal deflection for each of these three beams.

When the reflected beam 38 would make a deflection in the vertical direction 45 (see FIG. 2A), the deflection would be in parallel with the separation line 54 that separates the positive 52 and negative 53 areas. Because such deflection is in parallel with the separation, the part of the beam power incident on the positive area 64 (see FIG. 2B) does not change, and the part incident on the negative area 65 does not change either. The so called power distribution—the part incident on 52 with respect to the part incident on part on 53—remains unaltered. So, the power imbalance, $H_+-H_-$, and so signal H remain unchanged. Hence detector 50 does not detect deflections of the beam in the vertical direction. This means that for the case a beam deflection is composed out of a horizontal and a vertical part, only the horizontal part is sensed by sensor 50. So, the output of sensor 50 is a value for the horizontal component 47 of the deflection of the incoming beam 32.

FIG. 2D shows the electro-optic setup from FIG. 2A as seen from the side and illustrates how a beam deflection in the vertical direction would be determined. The incoming beam 32 having a vertical width as indicated by 67 is incident on the beam-splitter 34. The vertical direction is indicated by arrow 44. Vertical movement of the incoming beam 32 would cause the transmitted beam 41 to move in the vertical direction 46 also. The width of the transmitted beam 41 is indicated by 68 and is incident on a one-dimensional deflection sensor 56.

In principle sensor 56 works similarly as sensor 50 but its orientation with respect to the incident beam differs. For sensor 56, the line 60 separating its positive 58 and negative areas 59 is in parallel with the horizontal direction 49. Hence, the detection direction of sensor 56 is in the direction of the vertical axis 46 and is positive along with arrow 61 and negative in the direction opposing arrow 61.

The beam power 69 incident on the positive area 58 is transformed into a positive electric signal $V_+$, the incoming beam power 70 incident on the negative area 59 is transformed into a negative electric signal $V_-$. The power imbalance that sensor 56 measures is $V_+-V_-$, and corresponds with the vertical deflection V of beam 41. So, the vertical deflection $V=(V_+-V_-)$. Similar in the way like sensor 50 does not sense deflections in the vertical direction sensor 56 does not sense deflections in the horizontal direction. Combined with the fact that the deflection of the incoming beam 32 and the transmitted beam 41 are similar the output of sensor 56 is a value for the vertical component 44 of the deflection of the incoming beam 32.

In FIG. 2A. one one-dimensional value H of the deflection of the incoming beam 32 is determined from the reflected beam 38 by sensor 50 and is output electrically 71, and one one-dimensional value V of the deflection of the incoming beam 32 is determined from the transmitted beam by sensor 56 and is output electrically 72. The combination 73 of the two one-dimensional electric outputs 71 and 72 constitute a two-dimensional electric signal (H, V) which corresponds with the two-dimensional deflection of the incoming beam 32.

Furthermore, as an unexpected result, the inventive position sensor also permits the horizontal and vertical center positions to be adjusted without cross-couplings to each other. In the alignment of a prior art sensor, the sensor needs to be moved as a whole in the plane of the position-detection with the result that by movement of the center position of the first axis there is always some uncontrollable movement of the center position of the second axis. This unwanted dis-alignment of the second axis center then requires supplemental alignment which in turn dis-aligns the first axis center again. So the alignment of the prior art sensor is an iterative process requiring multiple steps which is time consuming to do manually, and is difficult to make automatic due to the iteration process involved. Our inventive sensor does not require to be moved as a whole over the plane of position detection for the alignment. Internally the two one-dimensional position detectors—the two axis—can be adjusted completely independent from each other by mounting each of them on a linear adjustable stage. This has the result that movement of the center position of the first axis does not alter the center position of the second axis. Hence the alignment of the axis can be done in one step which can be quickly performed manually, and would be easily to implement automatically.

Also, the angles the axis have in the plane of position detection are always perpendicular in the prior art sensor. They cannot be adjusted with respect to each other. Usually when motion is measured from objects by means of the optical lever method the eigenmodes of the motion are not precisely perpendicular. This means that the affinity of the light beam to be detected in the first dimension is not precisely perpendicular to the affinity of the light-beam in the second dimension, so the desired detection directions may have angles that are not 90 degrees to each other. This means that the two dimensions of the position determination can contain a cross-coupling with each other in the prior art sensor which cannot be adjusted away internally and has to be done by an external apparatus. In our embodiment the angles that the two dimensions have with respect to each other, and with respect to the encasing of the embodiment, can be adjusted fully over 360 degrees independently from each other by mounting each of them on a rotary stage. This enables the alignment of the detection-axis with the non-perpendicular axis of the two-dimensional signals. The rotary stage can furthermore be mounted to the linear stage mentioned earlier or the detector together with the linear stage can be mounted to the rotary stage.

For the one-dimensional position detection of the reflected and transmitted beams several options are available. The conventional bi-cell can be used, in combination with the opamp summing/subtraction stages, or in combination with any other signal processing system, weather analog or digital. Another option is to use the low-noise optical position sensor of J. D. Spear described in patent US005880461A. Any position sensitive photo sensor can be used. Both mentioned sensors would work fine but still have a severely limited bandwidth. To overcome the limited bandwidth problem we have invented a new one-dimensional optical beam position sensor that enables the wideband detection of the position of an optical beam with a bandwidth range from 0 Hz up to 60 GHz and more with commonly available parts and can be made even higher when better components become available.

The inventive one-dimensional optical position sensor consists out of an optical part and an electrical part. The optical part of the one-dimensional sensor (see FIG. 3) is designed symmetrically around the detection center position in order to compensate for errors due to thermal expansion of the sensor parts. This reduces the thermal drifts which is visible on the sensor output signals of the prior art position sensor. The electrical part is designed for simplicity, symmetry, signal output compatibility, and design freedom, see FIG. 3D.

Figure 3B:
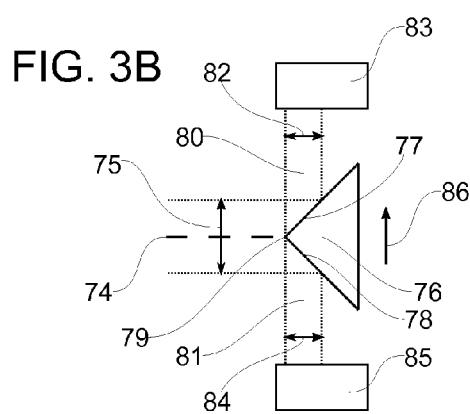
FIG. 3B shows a sketch of the top view of FIG. 3A where an optical beam is incident on the center of the inventive one-dimensional position sensor.
Figure 3C:
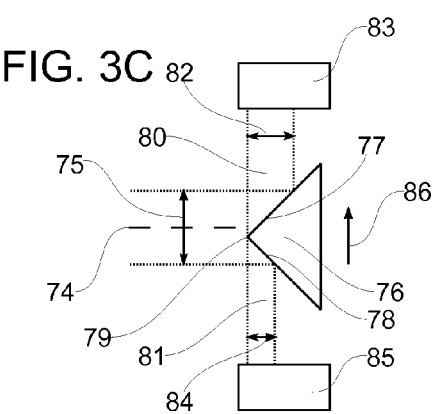
FIG. 3C shows a sketch of the top view of FIG. 3A where an optical beam is incident off the center of the inventive one-dimensional position sensor.
Figure 3D:
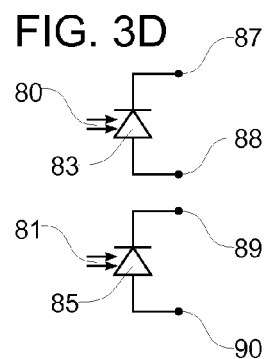
FIG. 3D shows the wiring diagram of the inventive one-dimensional optical position sensor.
Figure 3E:
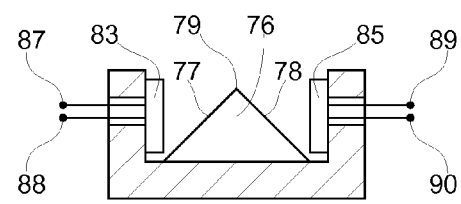
FIG. 3E is a top view of a fabrication assembly of FIG. 3A.
Figure 3F:
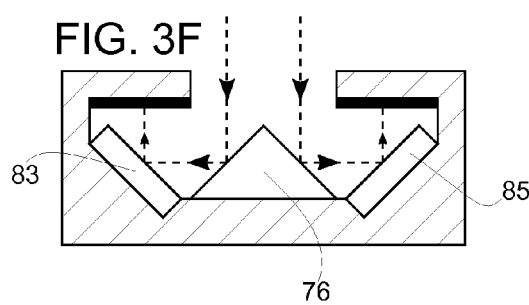
FIG. 3F is a top view of a fabrication assembly of FIG. 3A, where the photodetector areas are tilted with respect to the incident beam and reflect on a light absorber.
Figure 3G:
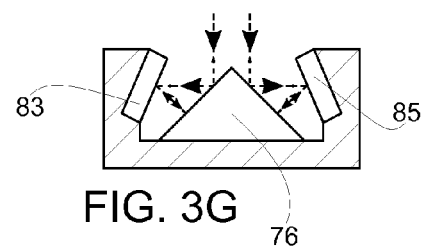
FIG. 3G is a top view of a fabrication assembly of FIG. 3A, where the photodetector areas are tilted with respect to their incident beams and reflect on a light reflective area that reflects back on the photodetector area.

FIG. 3A illustrates the perspective view and FIG. 3B and FIG. 3C illustrate the top view of how the optical part of the inventive one-dimensional light beam position sensor works. The light beam with center position 74 and width 75 is incident on a partitioning element 76. This beam can be the transmitted beam 38 or the reflective beam 41 of the setup depicted in FIG. 2A or the sensor can function as a standalone one-dimensional position detector. In FIG. 3, the partitioning element 76 is a prism that has two reflective legs 77 and 78 that have a sharp separation edge 79 between them. This has the result that the incoming beam is separated in two beams where the distance between the center position of the incident beam, 74, and the separation line of the partitioning element, 79, determines what spatial part of the incident beam is reflected in one direction, 80, and what other part of the incident beam 74 is reflected in a other direction, 81.

Beam 80 has a width 82 and is incident on photodiode 83. Beam 81 has a width 84 and is incident on photodiode 85. (Beam 80 and 81 can also be directed on the photodiodes by means of an optical fiber so that the photodiodes can be placed closer to each other reducing the length of the electrical wires. To do this, one or both beams are to be coupled into an optical fiber, which can be done by means of an optical collimator, for instance a convex lens. The beam exiting the fiber is then to be incident on a photodiode, 83 or 85.) In the FIG. 3A and FIG. 3B, beam 80 and beam 81 both have equal width so they are in balance. FIG. 3C illustrates the optical part of the inventive one-dimensional light beam position sensor where the incident beam center is offset the separation line of the partitioning element. From that illustration it is clear that due to this offset, beam 80 is wider than beam 81. Hence, there is an imbalance among the beams that corresponds with the offset between the incoming beam center and the separation line of the partitioning element. The offset between the beam center and the separation of the partitioning element is the position of the beam relative to the partitioning element. Assigning photodiode 83 to be the positive '+' segment and photodiode 85 to be the negative '−' segment the signal from photodiode 83 and 85 correspond to the signals from the conventional bi-cell position sensor areas I and II as in FIG. 1A. Hence, the inventive one-dimensional light beam position sensor determines the position of the incident beam 74 in the direction of arrow 86.

The partitioning element 76 can be made out of any material, as long as the legs are reflective. In case the material used does not have reflective properties it can be made reflective by adding a reflective coating to it. These methods are well known today. Thermal expansions are compensated as long as the angles between the reflective legs and the incident beam 74 are equal.

Also the angle between the legs does not have to be 90 degrees, so the prism shape is not a necessity and other shapes would also suffice as long as one spatial part of the beam is reflected in a different direction than the other spatial part of the beam.

Using conventional techniques, the edge of the separation line 79 can be made nearly atomically sharp. This means that our inventive sensor can be made without a separation gap, what is not possible with the conventional bi-cell or quad-cell. Without a gap, no gap error exists, and small area photodiodes can be used with equal precision as larger area photodiodes. Smaller area photodiodes have a smaller internal capacitance improving the bandwidth of the sensor. In case optical beams that are too wide for the photodiode area to enclose are required, the beam(s) can be focused on the photodiodes. This can be done by placing a convex lens before the beamsplitter 34, between the beamsplitter 34 and each one-dimensional optical sensor 50, 56, or between the partitioning elements 76 and the photodiodes, 83 or 85. In cases a separation gap is required, the sharp separation edge can be beveled to any value.

For the one-dimensional position detection of the horizontal motion, as was illustrated in FIG. 2A, the separation line 54 of the one-dimensional position sensor 50 corresponds with line 79 of a one dimensional position detector and the detection direction 55 corresponds with arrow 86. Signal $H_+$ then comes from photodiode 83 and signal $H_-$ from photodiode 85. For the vertical position detection another one-dimensional position detector is used, sensor 56. The separation line 60 of this one-dimensional sensor corresponds with line 79 of the inventive one-dimensional optical position sensor. Detection direction 61 then corresponds with arrow 86 and signal $V_+$ and $V_-$ correspond with the signals form photodiodes 83 and 85 respectively.

For the mechanical mount of the photodiodes 83 and 85 the plane of the photodiodes can be tilted with respect to the incoming light bundle to reduce back reflection of light in the direction of the incoming beam by reflecting it in another direction. This reduces optical pollution—which is about 40% of the incident light—in the application wherein the inventive sensor is used. In applications where coherent light is used pollution due to interference effects of the incoming bundle with the back scattered bundle are thus removable. To do this, the light bundle reflected from the photodiode is be made incident on a light absorber, with the result that the light pollution is almost completely eliminated, see FIG. 3F.

The back-reflection can also be used to enhance the responsivity of the photodiode. The reflection from the photodiode is then incident on a reflector so that the light is reflected back on the photodiode again, see FIG. 3G. This would increase the amount of light incident on the sensor by about 36% and thereby reduces the polluting light exiting the inventive sensor with the same amount.

The enormous advantage of our inventive design is that the cathodes 87, 89 and the anode 88, 90 of each photodiode 83, 85 are free (see FIG. 3D) and are not joint as in the monolithic bi-cell or quad-cell case (see FIGS. 1B and 1E). This advantage enables the development of simple, symmetrical, and few component DC wideband electronics that construct the position and sum signals from the photodiode currents, see FIGS. 4, 5, and 6.

Furthermore it also can be made electrically compatible with the bi-cell pin-out by connecting the cathodes together, or electrically compatible with the low noise sensor of J. D. Spear as described in patent US005880461A, by connecting the anode of the first photodiode to the cathode of the second photodiode and connecting the cathode of said first photodiode to the anode of said second photodiode.

Figure 4A:
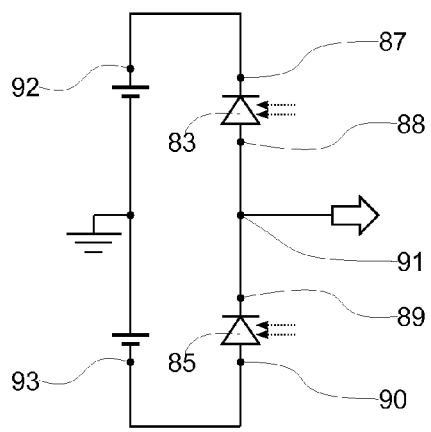
FIG. 4A shows the inventive circuit diagram where an output current provides the sum signal.

The simplest circuit that obtains the one-dimensional position signal and has a bandwidth ranging from DC up to very high frequencies (>1 GHz) is illustrated in FIG. 4A. Here photodiode 83 is placed in series with photodiode 85 with the anode 88 of photodiode 83 connected with the cathode 89 of photodiode 85 at node 91. To decrease the capacity of the photodiodes, a positive bias voltage 92 is applied to the cathode 87 of photodiode 83 and a negative bias voltage 93 is applied to the anode 90 of photodiode 85. So both photodiodes operate in reverse bias mode and are photo conductive. According to the Kirchhoff current law node 91 acts as a current source and sink. The current output of node 91 is the photo-current through photodiode 83, $I_+$, minus the photo-current through photodiode 85, $I_-$. So the current signal output by node 91 is $I_P = I_+ - I_-$ and corresponds with the one-dimensional position of the optical beam incident on the one-dimensional optical position sensor.

Figure 4B:
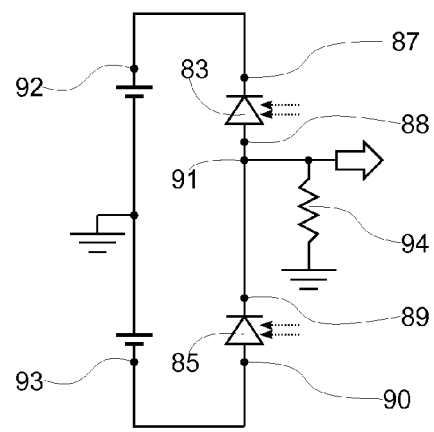
FIG. 4B shows the inventive circuit diagram where an output voltage provides the sum signal.

In case a voltage signal is required, a load resistor 94 can be placed between node 91 and ground, see FIG. 4B. The load resistor with value $R_1$ transforms the current output into a voltage output where the output voltage is $U_P = R_l \times I_P$.

The load resistor also functions to quickly discharge the internal capacitance of the photodiodes after the detection of a change in the position of the light beam. However, at high frequencies above 1 GHz, Johnson noise from the load resistor is predominant. Johnson noise is inversely related to a resistor's ohmic value by the equation $I^2_{noise} = 4KT/R$ where K is the Boltzmann constant, T is the temperature and R is the resistor value. The lower the resistor value, the larger is the Johnson noise current.

A larger resistor value creates a larger output signal voltage value. A lower resistor value creates a higher bandwidth by reducing the RC time constant which is governed by the load resistor value and the internal capacitance of the photodiodes. Resulting in a compromise between signal amplitude, bandwidth, and noise.

In wideband applications the cable connecting the output node 91 with the device that records the position information might be regarded long with respect to the wavelength of the higher detectable frequencies. For frequencies of 100 MHz, a cable of 50 cm is already regarded as long. (For 1 GHz this is 5 cm.) Long lines are subject to internal signal reflections that back-scatter in case the load applied at the end of the cable is not equal to the characteristic impedance of the cable itself. The signal reflections distort the original signal. Typical wideband (coax, band, stripline) cables are designed that have a characteristic impedance of 50 Ohms, 75 Ohms, or 300 Ohms. Other values also exist and can also be used. A matching load resistor or load network eliminates cable reflections.

For a 635 nm (red) laser with a power of 1 mW incident on the one-dimensional sensor containing two photodiodes of 3 pF capacitance each and a responsivity of 0.35 A/W at 635 nm. The current $I_P$ is 0.35 mA when the position of the light beam is utterly positive, and is −0.35 mA when the light beam is positioned utterly negative. So the top-to-top signal current variation is 0.70 mA, which generates a top-to-top voltage of 210 mV over a 300 Ohms load resistor when placed at the end of the 'long' cable. The RC time of the photodiodes in combination with the load resistor is 1.8 nano seconds, 241 MHz. The 210 mV top top signal can be used directly as input signal on a high speed analog to digital converter.

In case larger signals are needed, a more powerful light beam can be used. Using a 5 mW laser the top top output signal range changes to about 1 Volts. An avalanche photodiode can also provide a larger signal, typically 75 times larger than when a pin photodiode is used. In case higher bandwidths are required, the load resistor can be reduced. For the example given above, a 50 Ohm load resistor alters the RC time to 0.3 nS, 1450 MHz.

In case larger signal values are required without altering optical beam power or output load resistor value, the signals can be amplified by means of an amplifier. Suitable wideband amplifiers up to 60 GHz are commercially available at present and the design of these amplifiers is current art.

Figure 4C:
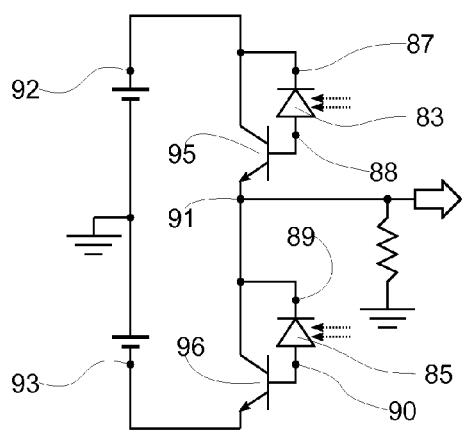
FIG. 4C and FIG. 4D show the inventive circuit diagram where the photo currents are amplified by means of an electron valve.
Figure 4D:
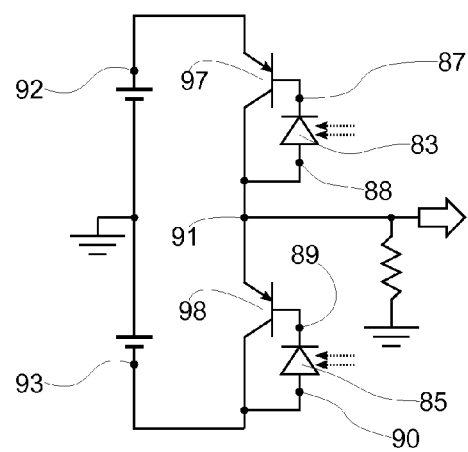
Figure 5A:
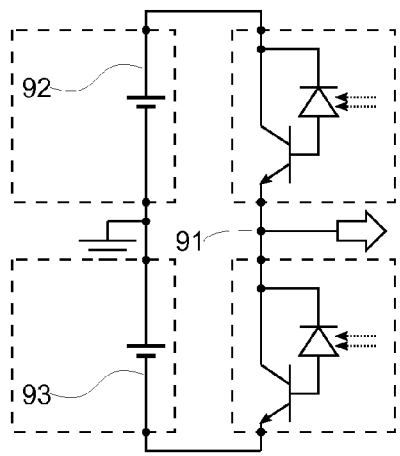
FIG. 5 shows different variations of FIG. 4 that are equivalent to FIG. 4.
Figure 5B:
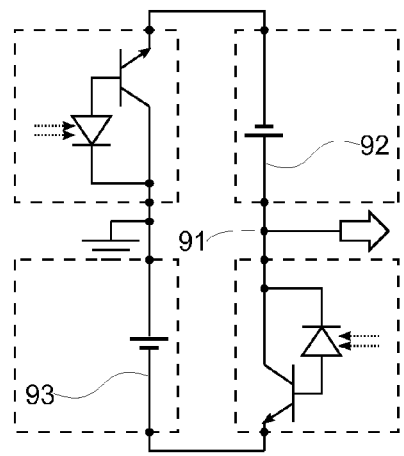
Figure 5C:
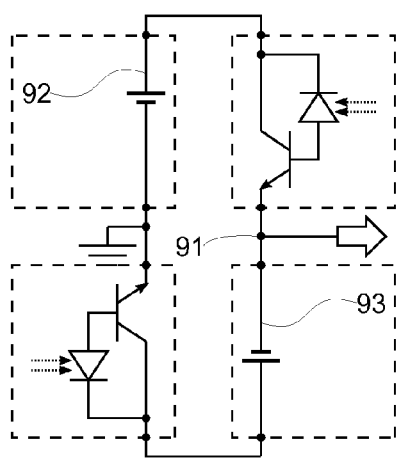
Figure 5D:
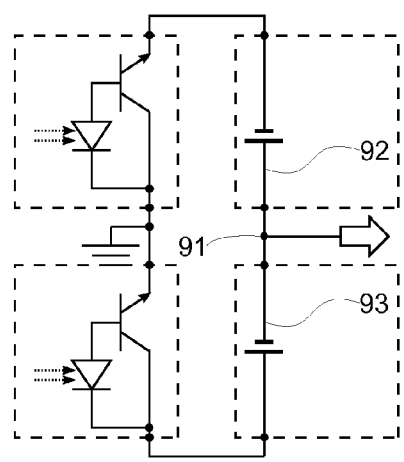

In case larger signals are required without using an avalanche diode but with a low load resistor, the photo-current can also be amplified by means of an electron valve, such as a transistor, see FIGS. 4C and 4D.

In FIG. 4C, the photo-current of photodiode 83 is led into the base of an NPN type transistor 95 by connecting the anode 88 of photodiode 83 to it. The collector of transistor 95 is connected to the cathode of the photodiode 87, which again is connected to the positive bias voltage supply 92. Out of the emitter of transistor 95 now flows a current which is the transistor current amplification factor+1, (β+1), times the photo-current $I_+$.

The photo-current from photo-diode 85 is led into the base of another NPN type transistor, 96, by connecting its anode 90 to the base of that transistor. The collector is connected to the cathode of the photodiode, 89, and the emitter is connected to the negative bias voltage supply 93. The emitter of transistor 95 is connected to the output node 91 and sources a current of (β+1)$I_+$ to it. The collector of transistor 96 and the cathode of photodiode 85 are also connected to the output node 91 and together sink a current of (β+1)$I_-$ from it. Hence, the output current of node 91 is $I_P = (β+1)(I_+ - I_-)$. The NPN transistors amplify the current into the base by about 100 times, and depends on the specific transistor used. So depending on the required load resistor, specified output voltage range, bandwidth, and photo-current range, a pair of transistors can be selected (or designed) that amplify the photo-currents to the desired value.

The voltage output in case of a 50 Ohms load resistor in combination with a 1 mW laser and transistors with a β of 100 times, the output would now be about 3.5 volts top-to-top. This type of voltage sizes can be very well measured by an analog-to-digital converter (ADC). Further, transistors 95 and 96 can be chosen a matched pair in order to enhance the identical behavior among the current sourcing side and the current sinking side.

Instead of using NPN type transistors for the current amplification, PNP type transistors can also be used, See FIG. 4D. In FIG. 4D the cathode 87 of photodiode 83 is connected to the base of PNP transistor 97. The emitter of transistor 97 is connected to the positive bias voltage supply 92. The anode 88 is connected to the collector of transistor 97 and together form a $(\beta+1)I_+$ current source and are connected to the output node 91. The cathode 89 of photodiode 85 is connected to the base of the other PNP transistor 98. The anode 90 is connected to the collector of transistor 98 and together are connected to the negative bias voltage supply 93. The emitter of transistor 98 forms a $(\beta+1)I_-$ current sink and is connected to the output node 91. Hence, for the circuit depicted in FIG. 4D output node 91 is a $I_P=(\beta+1)(I_+-I_-)$ current source.

The amplification factor of PNP type transistors typically is lower than that of the NPN type transistors. The amplification of PNP transistors is about 50 times, and also depends on the specific transistor used. So, depending on the required load resistor, specified output voltage range, and photo-current range, a pair of transistors can be selected that amplify the photo-currents to the desired value. Further, transistors 97 and 98 can be chosen a matched pair in order to enhance the identical behavior among the current sourcing side and the current sinking side.

On each side of the circuit loop in FIGS. 4A, 4B, 4C, and 4D, the circuit between 91 and the positive bias voltage supply (the photodiode with or without electron valve), and between node 91 and the negative voltage power supply (the other photodiode with or without electron valve) can be transposed in position (without rotation) with their respective bias voltage power supplies without affecting the basic electrical loop function. This is illustrated in FIGS. 5A, 5B, 5C and 5D for the NPN amplified case and similarly is applicable to the other circuits of FIG. 4.

Besides the large bandwidth, few component construction, and wide output compatibility shaping ability (shaping among: noise, bandwidth, output range, and output load), one other advantage of our inventive electrical design is that the sum signals can be easily distracted from the electrical system while affecting the response of the position signals hardly. This is done by using current mirrors.

Figure 6A:
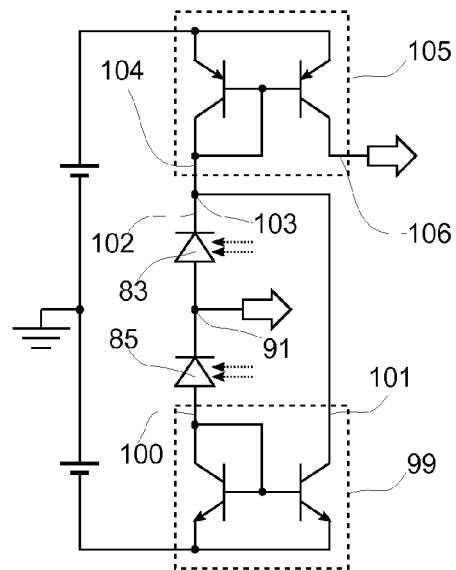
FIG. 6A shows the inventive circuit diagram where one output current provides a measure of deflection and another output provides a measure for the sum, which is derived from the photodetector currents by means of two current mirrors.

For the simplest design, originally illustrated in FIG. 4A, the sum stage addition is illustrated in FIG. 6A.

The current running through the negative photo-segment 85 ($I_-$) is mirrored by a NPN transistor current mirror 99, which has a current input 100, a current output 101, and a common which is connected to the negative voltage supply. The current running through photodiode 85 flows through wire 100, and current mirror 99 outputs a mirror of this current through wire 101.

The current through the positive photodiode 83 ($I_+$) runs through wire 102. Now, due to the connection of wire 101 to wire 102 at node 103, the current through wire 104 is the sum of the positive photodiode current $I_+$ plus the mirrored negative photodiode current $I_-$, hence through wire 104 runs the sum current, $I_S=(I_++I_-)$, corresponding to the total light intensity incident on both photodiodes 83 and 85.

Current mirror 105 is a PNP transistor current mirror which haves an input 104, an output 106, and a common which is connected to the positive voltage supply. The PNP current mirror 105 creates a mirror of the sum current that runs through wire 104 and outputs this mirror at wire 106 which functions as source current output terminal for the sum signal $I_s$.

The differential resistance of the current mirror inputs—the resistance between wire 104 and the positive bias voltage line and between wire 100 and the negative bias voltage line-originates from the PN junctions of the transistors and is usually much lower than 50 Ohms. Hence, the behavior of the system as depicted in FIG. 4A is hardly affected by the addition of the current mirrors as shown in FIG. 6A. The sum current output is also wideband due to the small collector to emitter capacitance's of the transistors.

Furthermore, the sum current $I_s$ output 106 can be transformed into a voltage output $U_s$ in ways similar to the transformation of the position current output $I_p$ into a voltage $U_p$ is performed. Also can it be amplified by means of an amplifier if a larger signal range is required.

Figure 6B:
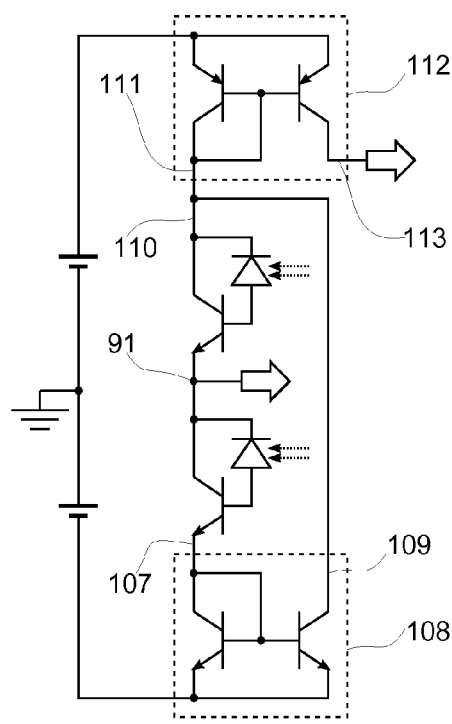
FIG. 6B and FIG. 6C show the inventive circuit diagram of FIG. 6A, where the photo-currents are amplified by means of an electron valve.
Figure 6C:
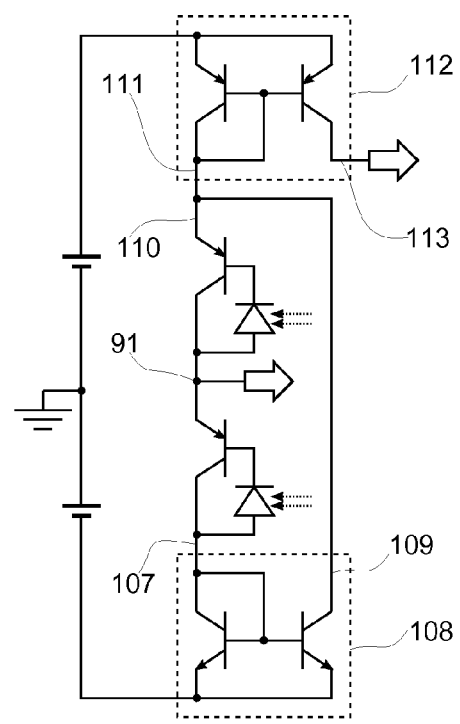

The distraction of the sum signal from the circuits shown in FIGS. 4B, and 4C is in method similar to that of FIG. 6A, see FIGS. 6B, and 6C. In order to keep the sum output current on equal footing with the position output current the current through wire 107, $(\beta+1)I_-$, is mirrored. This is done by current mirror 108 which sinks $(\beta+1)I_-$ at wire 109. Through wire 110 runs $(\beta+1)I_+$. Wire 109 is connected to wire 110 with the result that the sum current, $(\beta+1)(I_++I_-)=I_s$, runs through wire 111. This sum current is mirrored by current mirror 112 which outputs this at wire 113. Wire 113 is a current source output for the sum current $I_s$ and has about the same bandwidth as the position signal due to the small collector to emitter capacitance's of the transistors. The output current can also be transformed into a voltage using a resistor to ground or an I-V converter if desired.

For the current mirrors, Wilson type current mirrors can also be used. Further, all the current or voltage signals can be amplified internal or external to the inventive systems. Also active I-V or V-I converters can be used for any current to/from voltage transformations and (anti-aliasing) filters can be applied for bandwidth matching purposes or noise optimization. Furthermore RF design techniques can be applied for achieving bandwidths well into the radio frequency domain. These techniques are well known in the art and are used widely in integrated circuit technology, analog signal processing, digital signal processing, broadband systems, (optical) communication systems, and data transmission applications.

Having the position signal and the sum signal available, the normalized position signal can be obtained. The prior art method is to use an analog divider to divide the position signal with the sum signal. As discussed earlier this method is usable up to about 10 MHz. Digital normalization is also a conventional option but has the downside that there is a large input to output delay due to the digital calculation time involved.

Figure 7A:
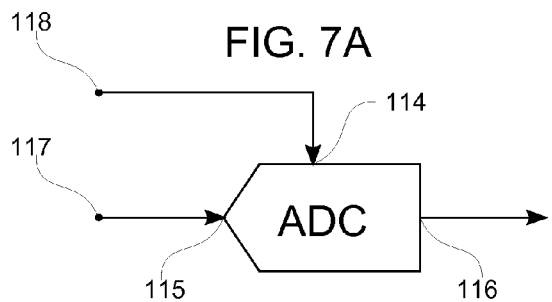
FIG. 7A shows the block diagram of the inventive normalization method comprising an analog-to-digital converter (ADC) with a reference input and a digital signal output that provides the normalized position value.
Figure 7B:
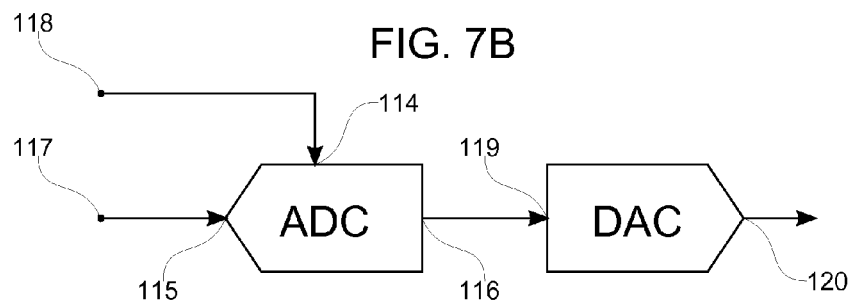
FIG. 7B shows the block diagram of the inventive normalization method comprising an analog-to-digital converter (ADC) with a reference input and a digital-to-analog converter (DAC) that provides an analog normalized position output value.
Figure 7C:
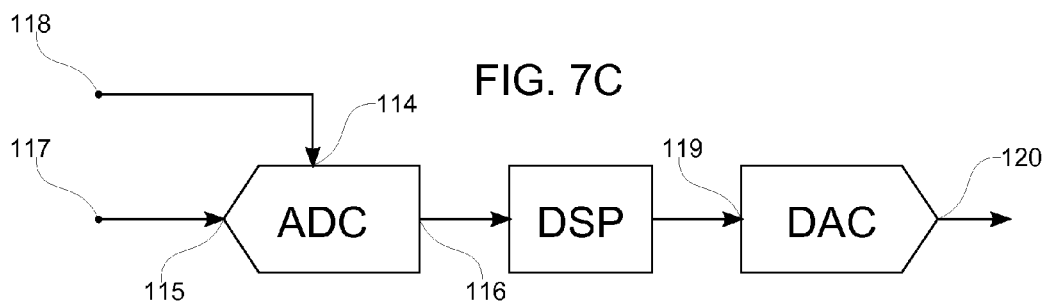
FIG. 7C shows the block diagram of the inventive normalization method comprising an analog-to-digital converter (ADC) with a reference input, a digital-signal-process (DSP), and a digital-to-analog converter (DAC) that provides a processed analog normalized position output value.
Figure 8:
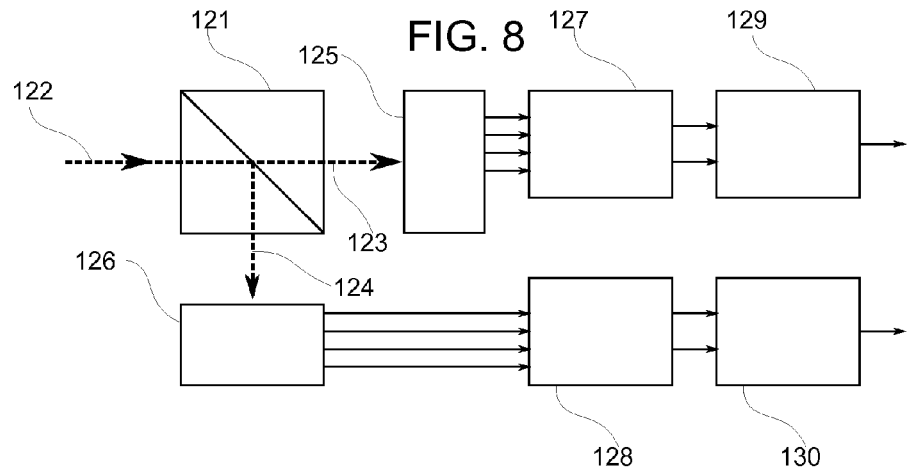
FIG. 8 shows the block diagram of the inventive two dimensional optical position sensor for reception of the two dimensional deflection of an optical beam and conversion of that signal to a two-dimensional electrical wideband normalized position output signal.

Our inventive high speed normalization system uses an analog-to-digital converter (ADC) that has a signal reference input 114, a signal input 115, and a digital output 116, see FIG. 7A. In such an analog-to-digital converter the reference scales the full scale output of the ADC. The actual output of the ADC is $(U_{ADC,in}/U_{ADC,ref})$ times the digital full scale output value. Thus, an ADC is capable of intrinsically normalizing the input signal with respect to the reference signal and outputting the result digitally as a fraction of the full scale. So, when applying a position signal 117 (which can be 91) to the signal input 115 of the analog-to-digital converter and a sum signal 118 (which can be 106 or 113) to the reference input 114 of the analog-to-digital converter, a system is created that digitally outputs 116 the position value normalized with respect to the sum signal value ($I_P/I_S$ or $U_P/U_S$). The normalization can be performed within one conversion cycle using parallel architecture (flash) analog-to-digital converters. Other architectures can also be used but can introduce a pole in the reference signal. Furthermore, optimal signal to noise ratios are obtained when the sum value is about the optimal reference value, which usually is specified by the manufacturer of the ADC. For two-dimensional position measurements, two analog-to-digital converters can be used. The sum output of one of the one-dimensional position detectors can be used to act as input for both analog to digital converters, or each analog to digital converter can be referenced mutually by the corresponding direction sum signal of the one-dimensional position detector. Because in nowadays systems almost all relevant analog signals are digitized, the normalization method usually requires no extra components for implementation and in case analog output signals are required, the digital signal can be made analog by means of a digital-to-analog converter (DAC), see FIG. 7B. Here the digital output of the ADC 116 is coupled to the digital input 119 of the DAC. The output 120 of the DAC is an analog signal. Furthermore, digital signal processing (DSP) and/or recording techniques can be performed on the digitized position signals weather they are eventually made analog or not. See FIG. 7C. The normalization method can be applied to any system in which some signal 115 has to be normalized with respect to another signal 114. For the digital signal processing, also use of Field Programmable Gate Array (FPGA) techniques can be made. For analog signal processing—weather for anti-aliasing filters of other types of filtering—use of Field Programmable Analog Array (FPAA) techniques can be made prior to the ADC stage, and/or after the DAC stage.

It will be apparent to those skilled in the art that various modifications and variations can be made in the method and system of the present invention without departing from the spirit or scope of the invention. The present invention is not limited by the foregoing description but is intended to cover all modifications, equivalents, and variations that come within the scope of the spirit of the invention and the claims that follow.

The invention claimed is:

1. A method for sensing the position of an incident optical beam in a plane perpendicular to its traveling direction and converting the position to an electrical signal, the method comprising:
  a) providing a symmetric partitioning element having a sharp edge which is able to spatially dissect said optical beam into a first dissected beam and a second dissected beam;
  b) providing a first photo detector which is able to convert the light signal of said first dissected beam into a first electrical signal;
  c) providing a second photo detector which is able to convert the light signal of said second dissected beam into a second electrical signal;
  d) providing a first voltage source which is able to apply a positive voltage to the cathode of said first photo detector with respect to the voltage of the anode of said first photo detector;
  e) providing a second voltage source which is able to apply a negative voltage on the anode of said second photo detector with respect to the voltage of the cathode of said second photo detector;
  f) providing an electrical connection between the anode of said first photo detector and the cathode of said second photo detector to obtain a difference signal from said electrical connection;
  whereby said difference signal provides a measure for the position of said optical beam in a plane perpendicular to its traveling direction with respect to the position of said symmetric partioning element, and the position of said optical beam can be measured with a minor delay caused by the applied reverse bias voltage on the junction capacitance of the photo detectors, and with a minor temperature drift caused by the symmetric shape of the partioning element, and with a minor dead gap caused by the sharp edge, and without having to obtain the difference signals using any active amplifier stage caused by the electrical connection between photo detectors.

2. An optical beam position sensor for measuring the position of an optical beam in a plane perpendicular to its traveling direction and conversion of the position to an electrical signal, the sensor comprising:
  a) a first electrical terminal;
  b) a second electrical terminal;
  c) a symmetric partioning element containing at least two planes receiving said optical beam on a sharp edge between planes spatially dissecting said optical beam into a first dissected beam that is outputted on a first beam output and a second dissected beam that is outputted on a second beam output;
  d) a first voltage source;
  e) a first photo detector which produces a first electrical signal in response to a light input coupled in series with said first voltage source between said first electrical terminal and said second electrical terminal, the first photo detector element being optically coupled to said first beam output;
  f) a second voltage source;
  g) a second detector which produces a second electrical signal in response to a light input coupled in a series with said second voltage source between said first electrical terminal and said second electrical terminal wherein said second electrical signal from said second photo detector is opposite in polarity to said first electrical signal of said first photo detector and wherein said first voltage source applies a reverse bias voltage across said second photo detector, the second photo detector element being optically coupled to said second beam output; and
  wherein the signal from said first electrical terminal is a measure for the position of said optical beam with respect to said sharp edge, and the position of said optical beam can be measured with a minor delay, and with a minor temperature drift, and with a minor dead gap, and without having to use any active amplifier stage to obtain the position signal.

3. The apparatus of claim 2 wherein said symmetric partioning element is a prism.

4. The apparatus of claim 2 wherein said symmetric partioning element has reflective planes.

5. The apparatus of claim 2 wherein the photo detectors are PiN type photodiodes.

6. The apparatus of claim 2 wherein the photo detectors are avalanche type photodiodes 7. The apparatus of claim 2 wherein the photo detectors are photo-transistors.

8. The apparatus of claim 2 wherein said first electrical terminal is coupled to amplifier electronics.

9. The apparatus of claim 2 further comprising a resistor that is coupled between said first electrical terminal and said second electrical terminal.

10. The apparatus of claim 2 further comprising:
a) an optical beam splitter having at least one optical input and two optical outputs, capable of receiving an incident optical beam on the optical, dividing it into a transmitted beam and a reflected beam, outputting said transmitted beam on a first optical splitter output, and outputting said reflected beam on a second optical splitter output, whereby said first optical splitter output is coupled to said apparatus of claim 2 wherein said transmitted beam is said optical beam; and
b) a second apparatus of claim 2 coupled to said second optical splitter output wherein said reflected beam is said optical beam of said second apparatus of claim 2;
whereby the position of said incident optical beam can be measured in two separate dimensions in a plane perpendicular to its traveling direction, without having to use any active amplifier stages to obtain the dimensionally separate electrical position signals, and with all benefits of the apparatus of claim 2.

11. The apparatus of claim 10 wherein the beamsplitter is a cube beamsplitter.

12. The apparatus of claim 10 wherein the beamsplitter is a polarizing beamsplitter.

13. The apparatus of claim 2 further comprising:
a) a source current mirror having an input, a common, and at least one output coupled in series between said first voltage source and said first photo detector, wherein the common of said source type current mirror is coupled to said first voltage source, and the input of the said source type current mirror is coupled to the cathode of said first photo detector;
b) a sink type current mirror having an input, a common, and at least one output, coupled in series between said second voltage source and said second photo detector, wherein the common of said sink type current mirror is coupled to said second voltage source, the output of the said sink type current mirror is coupled to the cathode of said first photo detector, and the input of said sink type current mirror is coupled to the anode of said second photo detector; and
whereby the first voltage source creates a reverse bias voltage across said first photo detector. said second voltage source creates a reverse bias voltage across said second photo detector, and the electrical signal from the output of said source type current mirror is measured for the amount of light received from said optical beam that can be used for normalization.

14. The apparatus of claim 13 whereby said source type current mirror is a PNP transistor type current mirror and said sink type current mirror is a NPN transistor type current mirror.

15. The apparatus of claim 13 whereby said source type current mirror is a p-channel MOSFET type current mirror and said sink type current mirror is an n-channel MOSFET type current mirror.

16. The apparatus of claim 13 further comprising an analog-to-digital converter having an analog signal input, an analog reference input, and a digital signal output, wherein the signal from said first electrical terminal is input for said analog signal input, and the signal from the output of said source type current mirror is input for said reference input;
whereby the value outputted by said digital signal output is a measure for the normalized position of said optical beam without having to obtain the normalization step using any analogue signal division or digital arithmetic division.

17. The apparatus of claim 16 wherein said analog-to-digital converter has a parallel architecture.

18. The apparatus of claim 16 wherein said analog-to-digital converter has a pipeline architecture.

* * * * *